United States Patent [19]

Brüggemann

[11] Patent Number: 5,119,927
[45] Date of Patent: Jun. 9, 1992

[54] FIRE-RESISTANT CONVEYOR BELT FOR UNDERGROUND MINING MADE OF ELASTOMERIC MATERIAL

[75] Inventor: Michael Brüggemann, Katlenburg, Fed. Rep. of Germany

[73] Assignee: Continental Aktiengesellschaft, Hanover, Fed. Rep. of Germany

[21] Appl. No.: 695,699

[22] Filed: May 3, 1991

[51] Int. Cl.⁵ ............................................. B65G 15/34
[52] U.S. Cl. ................................... 198/847; 198/846; 428/244; 428/246; 428/250; 428/920
[58] Field of Search ............... 428/246, 250, 244, 920; 198/846, 847

[56] References Cited

U.S. PATENT DOCUMENTS

| | | | |
|---|---|---|---|
| 4,243,576 | 1/1981 | Fischer et al. | 260/42.15 |
| 4,397,974 | 8/1983 | Goyert et al. | 524/143 |
| 4,444,917 | 4/1984 | Grube et al. | 521/131 |
| 4,705,161 | 11/1987 | Gozdeff | 428/250 |

OTHER PUBLICATIONS

Dr.-Ing. Herbert Hentschel, Robert Wingenbach "Flammwidrige Ausrüstung mittels Aluminiumhydroxide", Nov. 1978, 863-5.

Primary Examiner—James J. Bell
Attorney, Agent, or Firm—Robert W. Becker & Associates

[57] ABSTRACT

A conveyor belt for underground mining that is reinforced by reinforcement layers and is equipped with wear-resistant cover layers made from an elastomeric material is provided. The elastomeric cover layers are comprised of a halogen-free rubber mixture, a main component of which is ethylene vinyl acetate rubber (EVM), and aluminum hydroxide as a fire-proofing agent. In order to achieve a high fire-resistance while at the same time providing a good processability of the rubber mixture, the rubber mixture contains a small amount of stearyl amine. Thereby a calenderable rubber mixture is obtained which is characterized by a reduced stickiness to the calender rolls.

12 Claims, 1 Drawing Sheet

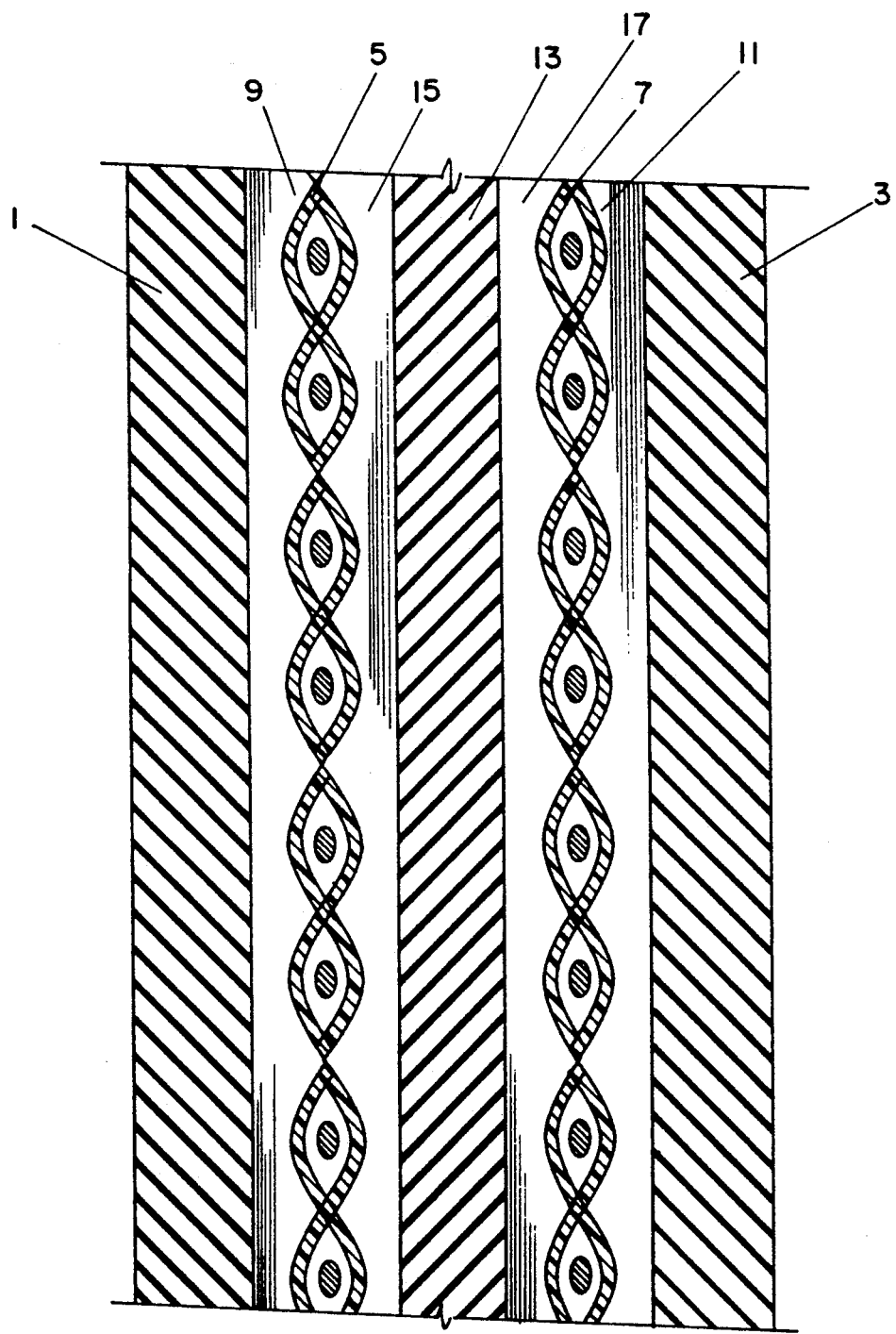

FIRE-RESISTANT CONVEYOR BELT FOR UNDERGROUND MINING MADE OF ELASTOMERIC MATERIAL

BACKGROUND OF THE INVENTION

The present invention relates to a conveyor belt for underground mining that is reinforced by reinforcement layers and is provided with wear-resistant cover layers or cover plates made from an elastomeric material, whereby the elastomeric cover layers are comprised of a halogen-free rubber mixture, a main component of which is ethylene vinyl acetate rubber (EVM), and aluminum hydroxide as a fire-proofing agent.

Conveyor belts for underground mining made of elastomeric material must be fire-proofed due to the stringent fire prevention code for underground mining operations. Suitable fire-proofing agents are halogen compounds. However, they have the disadvantage that they release poisonous, caustic and corrosive fumes when burning From a publication in "Gummi/Asbest/Kunststoffe", vol. 11/1978, pp. 863, it is known that fire-proofing of conveyor belts may be achieved by adding aluminum hydroxide instead of halogen containing additives to the rubber mixture. When burning, aluminum hydroxide forms only aluminum oxide and water vapor as decomposition products.

However, experiments have shown that aluminum hydroxide by itself is not adequate as a fire-proofing agent for conveyor belts in underground mining operations for fulfilling the extremely stringent requirements of the German coal mining organizations. Therefore, halogen containing additives must still be employed or halogen containing rubber mixtures must be used to pass fire-resistance tests and to receive a license for use of the respective conveyor belts in underground mining.

It has been demonstrated that ethylene vinyl acetate rubber (EVM) that contains aluminum hydroxide as a filler shows excellent fire-resistance. The higher the percentage of vinyl acetate in the rubber mixture the lower is the resulting calorific value of the rubber. Furthermore, EVM rubber has the additional advantage of burning without producing soot and emitting chlorine gas.

In order to obtain a sufficiently fire-resistant conveyor belt experiments concerning the use of aluminum hydroxide as a filler for EVM rubbers have been carried out. It was shown that the resulting EVM rubber is disadvantageously sticky which impairs processing on calenders during the manufacture of the cover layers and the rubberization of reinforcement layers.

In order to reduce the stickiness and to improve the processability it has been known from U.S. Pat. No. 4,243,576 to use a mixture of EVM rubber and EPDM (ethylene propylene diene monomer) rubber. EPDM rubber is characterized by a low smoke production during burning, however, its flammability characteristics are not as good as the those of EVM rubber.

It is therefore an object of the present invention to provide a conveyor belt for underground mining of the aforementioned kind which has an excellent fire-resistance whereby the rubber mixture employed has excellent processing characteristics.

BRIEF DESCRIPTION OF THE DRAWINGS

This object, and other objects and advantages of the present invention, will appear more clearly from the following specification in conjunction with the accompanying drawing, in which a section of the conveyor belt is represented in cross-section.

SUMMARY OF THE INVENTION

The conveyor belt of the present invention is primarily characterized by the rubber mixture containing stearyl amine.

The addition of stearyl amine as a mixing additive results in rubber mixture that is processable on calenders without the addition of EPDM rubber. This surprising effect is believed to result from a mono-molecular layer of stearyl amine that is formed on the calender surface so that the wetting characteristics of the rubber mixture are significantly reduced.

It is preferable that the material mixture for the cover layers contains 0.3 to 1.5 weight-percent of stearyl amine.

Without exceeding the scope of the present invention the fire-proofing effect of aluminum hydroxide, which is simultaneously used as a filler in the rubber mixture of the inventive conveyor belt, may be supplemented or increased by adding further halogen-free compounds such as magnesium carbonate, zinc borate, magnesium hydroxide and phosphorus or nitrogen containing chemicals.

In a further embodiment of the present invention, the rubber mixture used for the material mixture for the cover layers is comprised of 40 to 70 parts vinyl acetate and 60 to 30 parts ethylene. Preferably, the material mixture for the cover layers also contains 50 to 120 parts aluminum hydroxide per 100 parts of the rubber mixture.

In a further embodiment of the present invention, the reinforcement layers are made of fabric or of metal. Furthermore, it is preferable to provide the reinforcement layers with skim layers that are comprised of ethylene vinyl acetate rubber, aluminum hydroxide, stearyl amine and other common additives for rubber mixtures such as carbon black, plasticizers, lubricants, vulcanization activators, crosslinking agents and bonding agents.

The skim layers are preferably comprised of 100 to 160 parts aluminum hydroxide and 0.7 to 2.5 parts stearyl amine per 100 parts of ethylene vinyl acetate rubber.

In another embodiment, two reinforcement layers are provided which have an intermediate layer arranged between them. The intermediate layer is comprised of ethylene vinyl acetate rubber, aluminum hydroxide and stearyl amine and other common additives for rubber mixtures such as carbon black, plasticizers, lubricants, vulcanization activators, crosslinking agents and bonding agents. Preferably, the intermediate layer is comprised of 50 to 120 parts aluminum hydroxide and 0.7 to 2 parts stearyl amine per 100 parts of ethylene vinyl acetate rubber.

The invention provides a conveyor belt that is made from a halogen-free rubber mixture and has a low calorific value whereby the elastomeric material is characterized by a low stickiness to the calenders during the production of the conveyor belt.

DESCRIPTION OF PREFERRED EMBODIMENTS

The present invention will now be described in detail with the aid of a specific embodiment utilizing the only drawing.

In the drawing the inventive conveyor belt is shown in cross-section. The conveyor belt is provided with an upper rubber cover layer or cover plate 1 and a lower rubber cover layer or cover plate 3. The rubber cover layers 1, 3 are respectively connected to reinforcement layers 5 respectively 7 made from polyester/polyamide fabric via a thin skim layer 9, 11. Between the reinforcement layers 5 and 7 an intermediate layer 13 made from a rubber mixture is arranged which is connected via further skim layers 15 and 17 to the reinforcement layers 5 and 7. The mixture for the cover layers 1 and 3 contains an ethylene vinyl acetate rubber of 60% vinyl acetate and 40% ethylene. The components of the mixture used for the cover layers are as follows:

| | |
|---|---|
| vinyl acetate ethylene rubber | 100.0 phr |
| carbon black | 25.0 phr |
| aluminum hydroxide | 100.0 phr |
| processing agents | 3.0 phr |
| co-activator | 2.0 phr |
| plasticizer | 8.0 phr |
| octadecyl amine (stearyl amine) | 0.7 phr |
| vulcanization activator | 3.5 phr |
| crosslinking agent | 3.2 phr |

(phr = per hundred rubber)

The components for the rubber mixture for the skim layers 9, 11, 15, 17 are as follows:

| | |
|---|---|
| vinyl acetate ethylene rubber (60:40) | 100.0 phr |
| carbon black | 5.0 phr |
| aluminum hydroxide | 130.0 phr |
| silica (filler) | 20.0 phr |
| processing agent | 6.5 phr |
| co-activator | 2.0 phr |
| plasticizer | 10.0 phr |
| bonding agent | 5.0 phr |
| octadecyl amine (stearyl amine) | 2.0 phr |
| vulcanization activator | 0.5 phr |
| crosslinking agent | 9.7 phr |

For the intermediate layer 13 ethylene vinyl acetate rubber with a ratio of 60% vinyl acetate and 40% ethylene is also used and 130 phr aluminum hydroxide and 2.0 phr stearyl amine are added. Octadecyl amine is of a high purity since it is distilled from technical grade stearyl amine ($C_{18}H_{37}NH_2$). It is, however, also possible to use stearyl amine of a technical grade.

The manufacture of the conveyor belt proceeds as follows:

The mixtures are produced in a kneading unit. The determined amount of stearyl amine and aluminum hydroxide are added to the mixture in the kneading unit. To the resulting base mixtures the vulcanization activators and the crosslinking agent are added to produce the final mixture shortly before the last manufacturing step. To both sides of the reinforcement layers 5 and 7 a skim layer of a 0.3 mm thickness is applied by calendering with a four-roll calender. Subsequently, one of the thus prepared reinforcement layers is provided with the intermediate layer 13 by calendering. Then the second reinforcement layer is pressed to the intermediate layer 13 and thus attached thereto. The last manufacturing step consists of simultaneously applying the cover layers 1, 3 by calendering the cover layer mixture onto the prepared unfinished belt.

The accordingly manufacture conveyor belt is then guided through a vulcanization press. The vulcanized belt product is then cut to length. The resulting conveyor belt sections are connected to the required conveyor belt length at the respective underground mining work station.

The present invention is, of course, in no way restricted to the specific disclosure of the specification, examples and drawings, but also encompasses any modifications within the scope of the appended claims.

What I claim is:

1. A fire-resistant conveyor belt for underground mining that is reinforced by reinforcement layers and is provided with wear-resistant cover layers made from an elastomeric material, with said elastomeric cover layers being comprised of a halogen-free rubber mixture, a main component of which is ethylene vinyl acetate rubber, and aluminum hydroxide as a fire-proofing agent, the improvement wherein:
said rubber mixture contains stearyl amine.

2. A fire-resistant conveyor belt according to claim 1, wherein a material mixture for said cover layers contains 0.3 to 1.5 weight-percent of stearyl amine.

3. A fire-resistant conveyor belt according to claim 2, wherein said rubber mixture of said material mixture for said cover layers is comprised of 40 to 70 parts vinyl acetate and 60 to 30 parts ethylene.

4. A fire-resistant conveyor belt according to claim 2, wherein said material mixture for said cover layers contains 50 to 120 parts aluminum hydroxide per 100 parts of said rubber mixture.

5. A fire-resistant conveyor belt according to claim 1, wherein said reinforcement layers are made of fabric.

6. A fire-resistant conveyor belt according to claim 1, wherein said reinforcement layers are made of metal.

7. A fire-resistant conveyor belt according to claim 1, wherein said reinforcement layers are provided with skim layers being comprised of ethylene vinyl acetate rubber, aluminum hydroxide, stearyl amine and other common additives for rubber mixtures.

8. A fire-resistant conveyor belt according to claim 7, wherein said common additives are selected from the group consisting of carbon black, plasticizers, lubricants, vulcanization activators, crosslinking agents and bonding agents.

9. A fire-resistant conveyor belt according to claim 7, wherein each one of said skim layers is comprised of 100 to 160 parts aluminum hydroxide and 0.7 to 2.5 parts stearyl amine per 100 parts of ethylene vinyl acetate rubber.

10. A fire-resistant conveyor belt according to claim 1, having two of said reinforcement layers, with an intermediate layer being arranged between said two reinforcement layers, whereby said intermediate layer is comprised of ethylene vinyl acetate rubber, aluminum hydroxide and stearyl amine and other common additives for rubber mixtures.

11. A fire-resistant conveyor belt according to claim 10, wherein said common additives are selected from the group consisting of carbon black, plasticizers, lubricants, vulcanization activators, crosslinking agents and bonding agents.

12. A fire-resistant conveyor belt according to claim 10, wherein said intermediate layer is comprises of 50 to 120 parts aluminum hydroxide and 0.7 to 2 parts stearyl amine per 100 parts of ethylene vinyl acetate rubber.

* * * * *

UNITED STATES PATENT AND TRADEMARK OFFICE
CERTIFICATE OF CORRECTION

PATENT NO. : 5,119,927

DATED : June 9, 1992

INVENTOR(S) : Michael Brüggemann

It is certified that error appears in the above-identified patent and that said Letters Patent is hereby corrected as shown below:

On the Title page, item

[30]        Foreign Application Priority Data

May 9, 1990 [DE] Fed. Rep. of Germany ..... 4014850

Signed and Sealed this

Ninth Day of November, 1993

Attest:

BRUCE LEHMAN

Attesting Officer       Commissioner of Patents and Trademarks